(12) United States Patent
Marom et al.

(10) Patent No.: US 6,657,770 B2
(45) Date of Patent: Dec. 2, 2003

(54) PROGRAMMABLE OPTICAL MULTIPLEXER/DEMULTIPLEXER

(75) Inventors: Dan Mark Marom, Howell, NJ (US); David Thomas Neilson, Old Bridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 54 days.

(21) Appl. No.: 09/944,800

(22) Filed: Aug. 31, 2001

(65) Prior Publication Data

US 2002/0196520 A1 Dec. 26, 2002

Related U.S. Application Data

(60) Provisional application No. 60/300,272, filed on Jun. 22, 2001.

(51) Int. Cl.[7] .............................................. G02B 26/00
(52) U.S. Cl. ..................... 359/290; 359/115; 359/291
(58) Field of Search ..................... 359/115–119, 124, 359/127–133, 298, 290–291, 558, 618, 619, 652, 641–42, 644

(56) References Cited

U.S. PATENT DOCUMENTS

| | | | | | |
|---|---|---|---|---|---|
| 5,960,133 | A | * | 9/1999 | Tomlinson | ..................... 385/18 |
| 6,268,952 | B1 | * | 7/2001 | Godil et al. | ................. 359/291 |
| 2002/0131687 | A1 | * | 9/2002 | Wilde | ........................... 385/24 |

* cited by examiner

Primary Examiner—Jordan M. Schwartz
Assistant Examiner—Jessica Stultz
(74) Attorney, Agent, or Firm—Barry H. Freedman; David A. Sasso

(57) ABSTRACT

A programmable optical demultiplexer can independently assign every input optical channel in a WDM optical communications signal to depart from any desired output port. The demultiplexer device can also be operated in the reverse direction, and thus achieve programmable optical multiplexer functionality, by accepting different wavelengths at each of multiple input ports and efficiently combining the wavelength channels at the multiplexer output port. The programmable multiplexer/demultiplexer device has an optical arrangement for spatially dispersing the optical wavelengths, and tunable micro-mirrors for beam steering each channel independently. Controlling the beam reflection direction determines the connectivity between the input and output ports at the wavelength level.

32 Claims, 6 Drawing Sheets

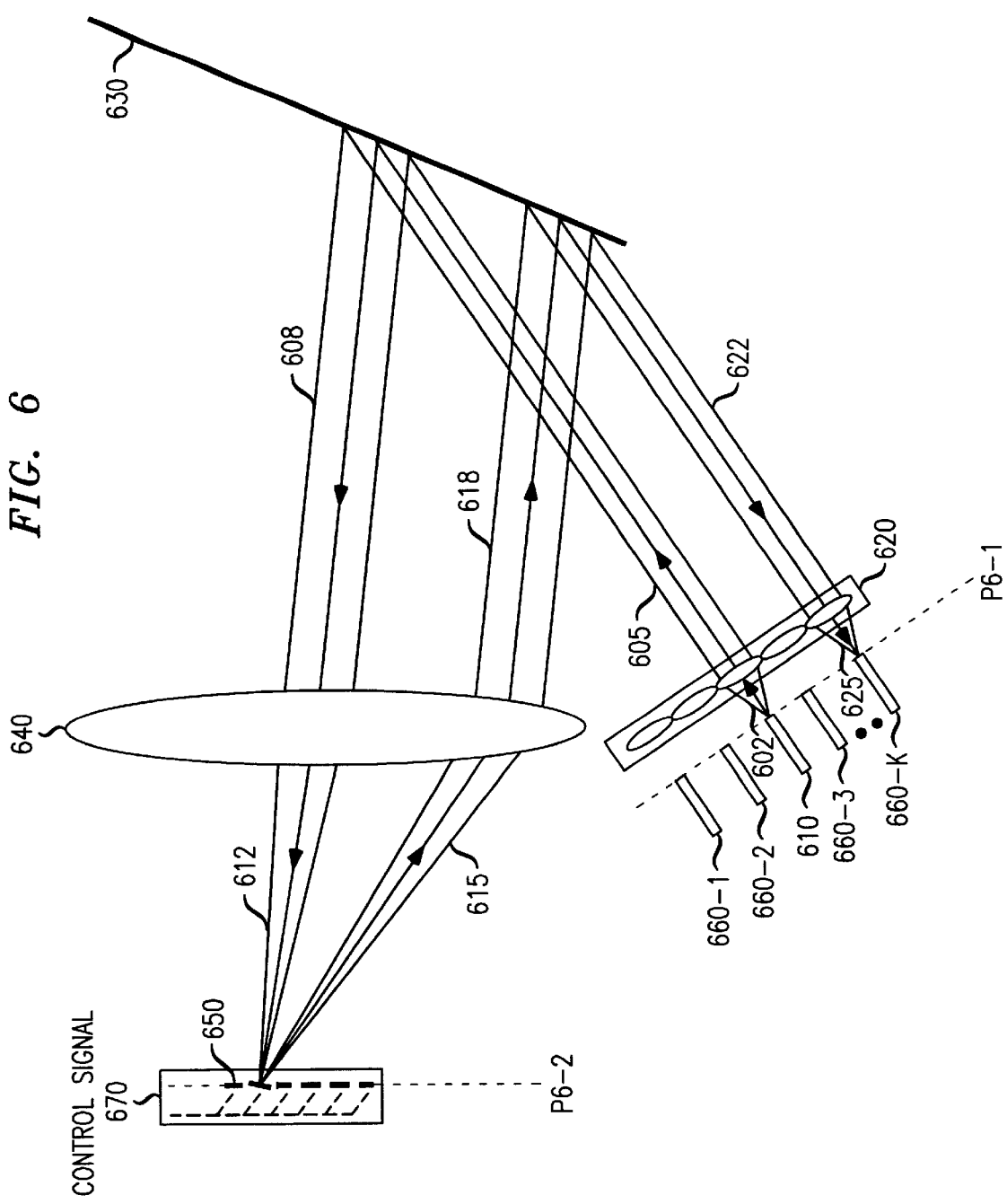

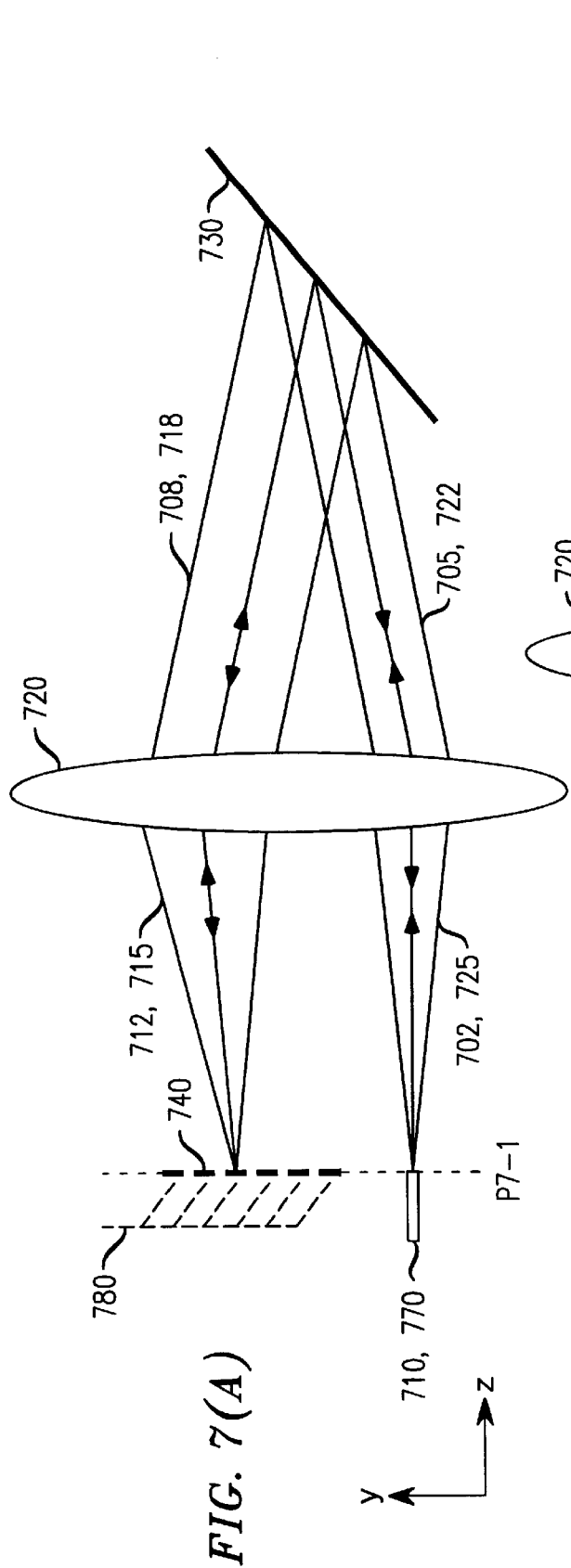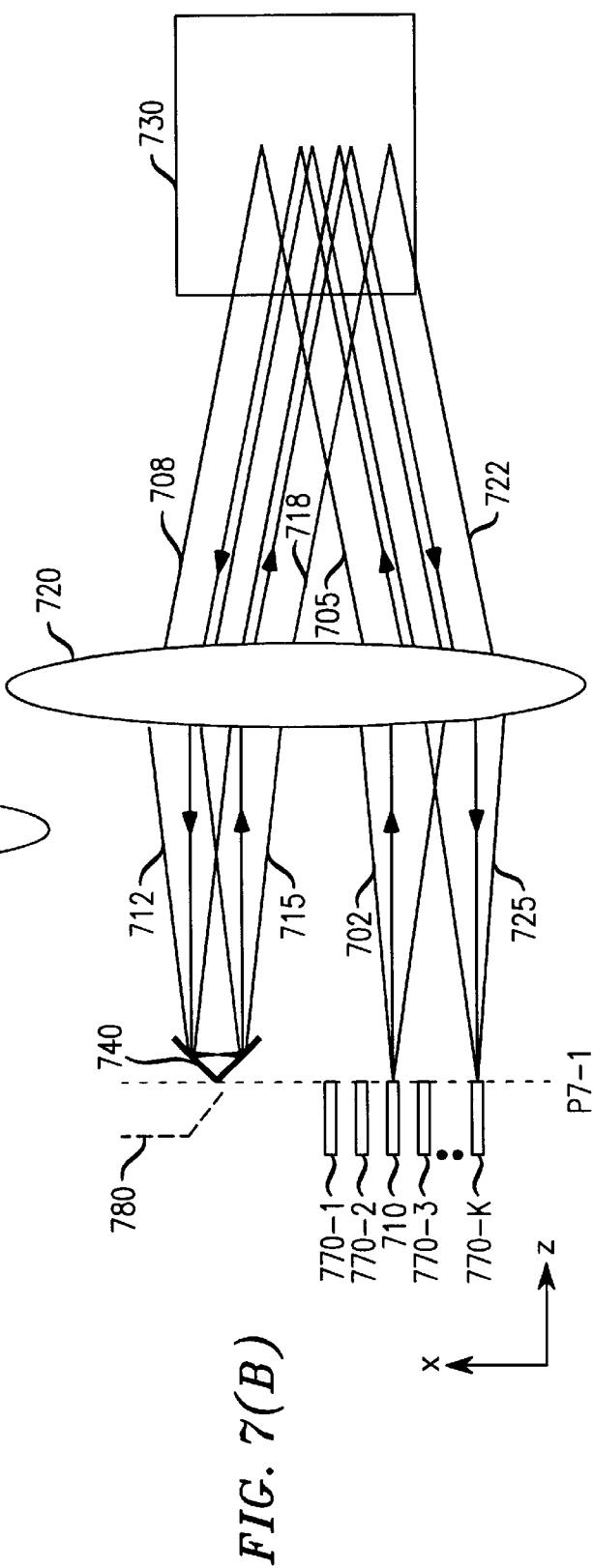
FIG. 7(A)
FIG. 7(B)

PROGRAMMABLE OPTICAL MULTIPLEXER/DEMULTIPLEXER

CROSS-REFERENCE TO RELATED APPLICATION

This application claims priority of Provisional Application Ser. No. 60/300,272 filed on Jun. 22, 2001.

TECHNICAL FIELD

The present invention relates to fiber optic networks, and more particularly to fiber optic wavelength division multiplexers and demultiplexers.

BACKGROUND OF THE INVENTION

The transmission capacity of fiber-optic communication systems has increased significantly by use of wavelength division multiplexing (WDM) techniques. In a WDM communication system, multiple channels, where each channel is differentiated by using a unique wavelength of light, carry modulated optical signals in a single optical fiber between a transmitter and a receiver. The transmitter uses an optical multiplexer to combine multiple channels into the fiber for transmission, and the receiver uses an optical demultiplexer to separate the optical channels for detection. FIG. 1 illustrates a typical optical demultiplexer (demux) 120 containing a single input port 110 and multiple output ports 130-1 through 130-N, where each optical channel from the input port is mapped to a unique output port in sequential order (channel 1 will exit from port 130-1, channel 2 from port 130-2, etc.). Optical multiplexers are simply demultiplexers operated in the reverse direction, where a specific wavelength has to be supplied to the correct input port to emerge at the output port as a multiplexed signal.

It is expected that in the foreseeable future, communication systems will evolve to communication networks consisting of multiple access nodes, each containing a WDM transmitter and/or receiver, that are interconnected in some prescribed fashion (e.g., ring or bus) or arbitrarily (e.g., mesh). Information flow between two access nodes will be carried on an available optical wavelength that is assigned by a protocol according to network availability. The transmitting node will have to employ a bank of lasers at different wavelengths as available sources, all connected properly to the multiplexer's ports, utilizing only a small fraction of the lasers at any given time for communication. This is clearly an expensive solution, as most of the hardware is lying idle. Alternatively, wavelength tunable lasers can be used. However, tunable lasers cannot be connected directly to the optical multiplexer, as the multiplexer's input ports can only accept the correct wavelength to function properly.

FIG. 2 illustrates a possible solution, consisting of a switching matrix 220 added to the node, whose role is to route the tunable lasers's signals 210-1 through 210-M to the correct input ports 230-1 through 230-N of multiplexer 240. This added hardware is again costly. It is clear that the receiving node will also have to address the same issues for the demultiplexing and detection task.

SUMMARY OF THE INVENTION

In accordance with the present invention, a programmable optical multiplexer/demultiplexer can establish a reconfigurable connection between any two ports from the multiple device ports, independently for each optical wavelength that is inserted by the input ports.

In one embodiment of the present invention, a programmable demultiplexer is arranged to receive an input signal containing components at N different wavelengths from an optical input port, and distribute the input signal components among K output ports. The input signal is collimated by a particular lens in a microlens array, which lens is aligned to the input port. The microlens array contains K additional lenses that are aligned to the K output ports. The resultant collimated beam originating from the input port is then made incident on a diffraction grating, which angularly disperses the composite optical signal according to wavelength, thereby forming N separate beams having different wavelengths and distinct propagation angles. Each of the N separate beams propagates to a single lens that is arranged to collect all the beams and provide, for each wavelength, a converging beam focused onto a particular micro-mirror in an array containing N micro-mirrors. Each mirror in the array is individually controlled to reflect the incident beam (representing a corresponding wavelength) in a desired direction, such that it will (a) re-enter the lens, (b) be collimated by the lens and redirected to a different location on the diffraction grating, and (c) be eventually coupled from the diffraction grating through a particular lens in the micro-lens array to a desired output port (the particular micro-lens is aligned to the desired output port). Generally, the number of output ports K and optical wavelength components N are independent. The demultiplexer can be designed to operate in the regime where K=N, so that each wavelength component can be assigned to any output port. The invention can also be operated in a mode where K<N, in which case more than one wavelength is applied to an output port, or in a mode where K>N, in which case one or more output ports are not used. In any event, the present invention enables assignment of any wavelength to any output port.

The embodiment just described can be operated in the "reverse" direction, in order to act as a programmable multiplexer, rather than as a demultiplexer. In the multiplexer arrangement, K input signals each containing one or more different wavelengths, are received from a plurality of K optical input ports and must be combined and made available at a single output port. The K input signals cumulatively contain a total of N different wavelengths, or, stated differently, any particular wavelength component can exist at only one of the K input ports, or contention will occur. Each input signal is collimated by a respective lens in a microlens array that contains K+1 lenses. One lens is aligned with the output port, while the remaining lenses are aligned each to a corresponding input port. The resultant collimated beam originating from each input port is then made incident on a diffraction grating, which diffracts the optical signal as a function of its wavelength. The diffraction grating is arranged such that all of the separate beams, which have different wavelengths and therefore distinct propagation angles, propagate to a single lens that collects all the beams and provides, for each wavelength, a converging beam focused onto a particular micro-mirror in an array. Each mirror in the array is individually controlled to reflect the incident beam (representing a corresponding wavelength) in the desired direction, such that it will (a) re-enter the lens, (b) be collimated by the lens and redirected to a single location on the diffraction grating, and (c) be eventually coupled from the diffraction grating to the output port through the particular lens in the micro-lens array that is aligned with the output port. Here again, in general, the number of input ports K and optical wavelength components N are independent. The multiplexer can be designed to operate in the regime where K=N, so that each wavelength component can originate at any input port. The invention can also be operated in a mode where K<N, in which case more than one wavelength is applied to an input port, or in a mode where K>N, in which case one or more input ports are not used. In any event, the present invention enables multiplexing (combining) of all input wavelengths originating at the K input ports to the output port.

BRIEF DESCRIPTION OF THE DRAWINGS

The present invention will be more fully appreciated by consideration of the following detailed description, which should be read in light of the drawing in which:

FIG. 6 is an illustration of an alternative embodiment of the present invention using tilting micro-mirrors and functioning as a programmable demultiplexer;

FIGS. 7(*a*) and 7(*b*) are different views of yet another embodiment of the present invention using shift-inducing micro-prisms and functioning as a programmable demultiplexer.

DETAILED DESCRIPTION

The programmable optical multiplexer/demultiplexer in accordance with the present invention provides for wavelength routing between the input and output ports. It is designed for selectively multiplexing, demultiplexing and switching of optical channels in dense wavelength division multiplexed (DWDM) communication systems. In this regard, a demultiplexer can be thought of as a 1×K wavelength switch (1 input and K outputs), while a multiplexer can be thought of as a K×1 wavelength switch (K inputs and 1 output).

Figure 1:
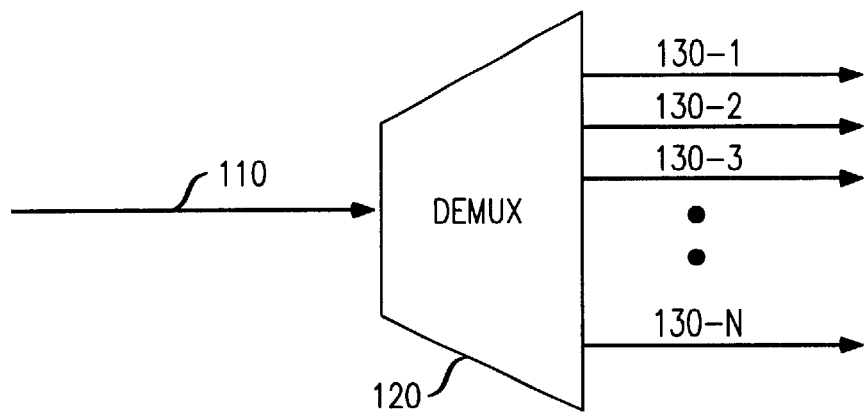
FIG. 1 is an illustration of the operation of a conventional optical wavelength demultiplexer.
Figure 2:
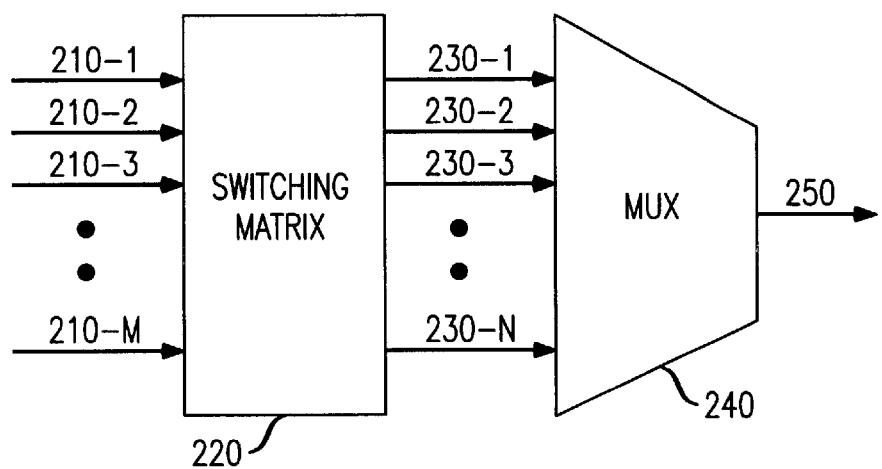
FIG. 2 is an illustration of the conventional required hardware for multiplexing multiple channels with tunable wavelength sources.
Figure 3A:
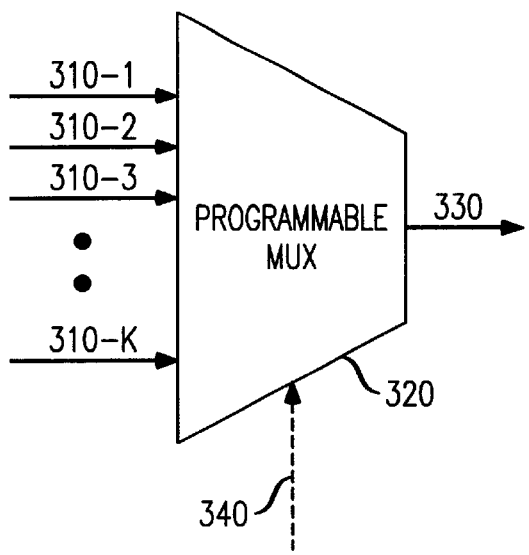
FIG. 3(*a*) is an illustration of the general operation of the present invention, when operating as a programmable optical wavelength multiplexer, while FIG. 3(*b*) is an illustration of the general operation of a the present invention, when operating as a programmable optical wavelength demultiplexer.
Figure 3B:
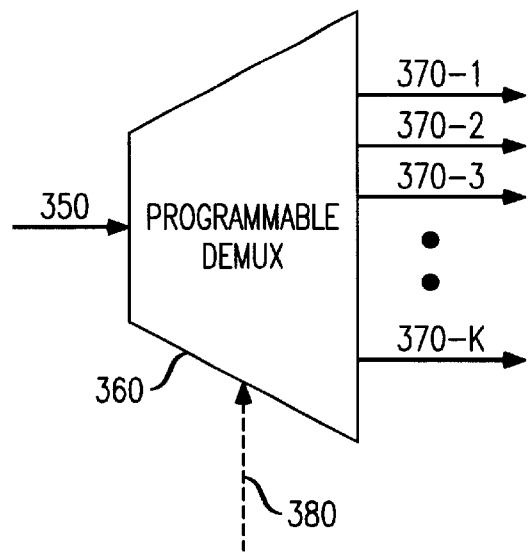

FIG. 3(*a*) is a diagram illustrating the overall functioning of the present invention when operated in programmable multiplexer mode. Programmable multiplexer 320 includes a plurality of input ports 310-1 and 310-*k* which are combined and output from output port 330. In accordance with the invention, it is desired that any optical channel or combination of channels can be inserted at any input port 310-1 through 310-*k* and emerge at the output port 330. Control of the multiplexing process, which is the capability that makes the multiplexer "programmable" is achieved by virtue of a control input 340, which establishes a unique pathway in multiplexer 320 for each optical channel between any one of its input ports and its output port. Multiplexer 320, as described more fully below, is arranged such that it physically prevents the detrimental possibility of combining two optical channels operating on the same wavelength from two different input ports.

As shown in FIG. 3(*b*), when operating in programmable demultiplexer mode, multiplexer 320 is operated in the reverse direction. A programmable demultiplexer 360 has input port 350 arranged to receive an optical communications signal containing multiple optical wavelengths. The individual wavelengths are then independently assigned to the k output ports, 370-1 through 370-*k*, by the programmable demultiplexer, as prescribed by the control signal 380. Note that the number of input or output ports, k, may be equal to or different from the number of DWDM channels.

Figure 4:
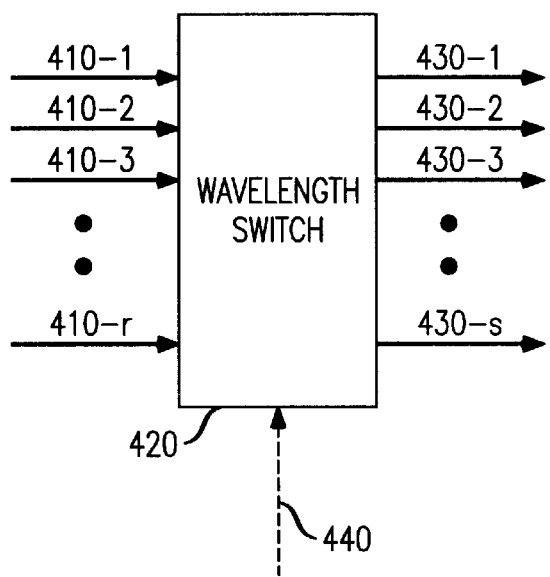
FIG. 4 is an illustration of a wavelength switch with multiple input ports and multiple output ports.

FIG. 4 illustrates, in general terms, another operation mode wherein the present invention implements a wavelength switch 420 having multiple input ports 410-1 through 410-*r* and multiple output ports 430-1 through 430-*s*, where r and s can be different integers. The different optical channels are distributed among the input ports 410-1 through 410-*r*, where each port may carry multiple channels, but no channel can appear on two different input ports simultaneously. Each optical channel is routed independently to its required output destination port, 430-1 though 430-*s*, as prescribed by the control signal 440.

Figure 5:
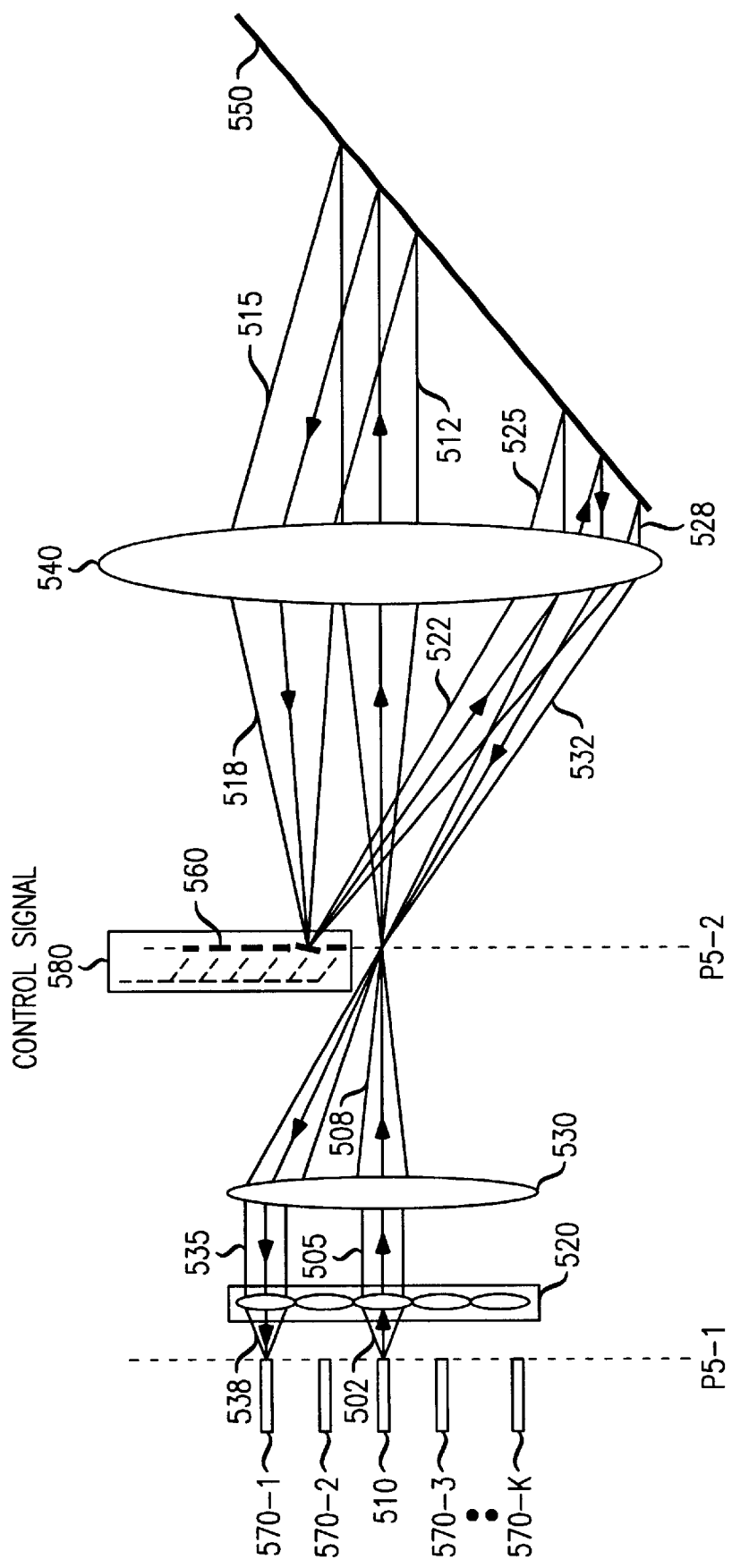
FIG. 5 is an illustration of an embodiment of the present invention using tilting micro-mirrors and functioning as a programmable demultiplexer.

FIG. 5 is an illustration of an embodiment of the present invention using tilting micro-mirrors and functioning as a programmable demultiplexer as was described generally in connection with FIG. 3(*b*). Input port 510, typically a single mode optical fiber, carries an input optical signal that contains multiple optical wavelengths λ-1 through λ-N of a DWDM communication system. To accomplish the demultiplexer function, it is desired that each of these wavelengths be assigned to one of the various output ports 570-1 through 570-*k*, as instructed by a provided control signal 380 of FIG. 3(*b*). Note that it is possible for more than one wavelength to be assigned to the same output port, and that the number k of output ports does not have to be equal to the number N of wavelengths in the input optical signal.

As shown in FIG. 5, the optical beam 502 emerging from input port 510 is rapidly diverging, due to diffraction effects. A micro-lens array 520 is aligned with and spaced apart from input port 510, as well as with output ports 570-1 through 570-*k*, such that the ports are at the micro-lens front focal plane, denoted as plane P5-1 by the dotted line in the figure, and each port is on the optical axis of its matching micro-lens. The effect of the individual micro-lens that is aligned to the input port 510, is to collimate the diverging beam 502 to a wide beam 505, whose diffraction effects are greatly reduced. A high numerical aperture lens 530, whose clear aperture contains all the micro-lenses in array 520, focuses the beam 505 at its back focal plane, denoted as plane P5-2 by the dotted line in the figure. The beam then continues to diverge.

The diverging beam 508 is collimated by a second lens 540, that is placed such that its front focal plane coincides with plane P5-2, resulting in the beam 512 that still contains all of the input optical channels. Beam 512 is directed onto a reflection diffraction grating 550 that introduces wavelength dependent diffraction and serves to separate the optical channels, so that each channel can be independently accessed. An illustrative diffracted beam 515, propagating at a unique direction or angle with respect to grating 550, contains only a single optical channel at a particular wavelength λ-j. The diffracted beam 515 propagates back through the lens 540, which focuses the beam 518 at the lens's front focal plane, plane P5-2. There will be N such beams, one for each wavelength λ-1 through λ-N, each propagating at a slightly different direction. It is thus seen that the optical subsystem consisting of the lens 540 and diffraction grating 550 serves to spatially separate the optical channels at plane P5-2. One proficient in the field can design the optical system to provide the sufficient spatial separation of the wavelength channels at this plane. Note that FIG. 5 traces only the single wavelength λ-j for simplicity.

A micro-mirror array 560 is placed at plane P5-2, such that each optical channel is focused on a separate mirror element. Each mirror can be tilted by an electrical control signal 580, such that the reflected beam 522, now diverging, is propagating at a new, desired direction.

In the arrangement of FIG. 5, diverging beam 522 is collimated by lens 540, and the collimated beam 525 is diffracted off reflective grating 550, resulting in beam 528 that is propagating back towards the device output ports. Lens 540 focuses beam 528, converting it to a converging beam 532 which focuses the beam at plane P5-2 (front focal plane of lens 540). Beam 532 diverges after passing plane P5-2 and is recollimated by lens 530, resulting in beam 535. Beam 535 is focused by one of the micro-lenses of the micro-lens array 520, with the focused beam 538 at plane P5-1 and coupling to the desired one of the output ports 570-1 through 570-K. The output port is selected for each wavelength by the beam propagation direction that is imparted by the tilt of the individual mirrors in mirror array 560.

By virtue of the arrangement of FIG. 5, each wavelength is controlled separately, and it is therefore possible to assign each wavelength independently to any output port. In other words, the invention allows the input optical wavelength channels to emerge on any desired output port. The arrangement just described also advantageously permits one or more of the output ports 570-1 through 570-k to receive more than one optical beam and consequently more than one wavelength. This is because the mirrors in array 560 are arranged to reflect the beams back through the same wavelength dependent imaging system (consisting of lenses 540, 530, 520 and grating 550) and the imaging system is designed to convert the propagation directions of all reflected beams off the micro-mirror array simultaneously to their desired output ports. However, it is to be noted that, when there is no need to have more than one optical beam received at a single output port, the spatially separated wavelengths reflected by the individual mirrors in micro-mirror array 560 can be directed back toward output ports 570-1 through 570-k in other imaging arrangements in addition to the arrangement of FIG. 5. In such other arrangement, it is not essential that the paths include a second passage through lens 540 nor a second incidence on grating 550. Rather, a person skilled in the art will recognize that the tilt imposed by the micro-mirror corresponding to wavelength λ-j in array 560 determines to which output port that particular wavelength channel will couple, and that various different arrangements can be used to direct the output of the micro-mirrors to the individual output ports.

The ability to tilt each of the individual mirrors in mirror array 560 to one of multiple states may be imposed by various techniques, most often determined by an electrical voltage. Since a unique mirror tilt is required to select the output port, there will also be a unique voltage corresponding to this tilt and port. The necessary voltage to control each output port for every wavelength component of the WDM system can be measured and stored in a database. In operation, a command requests a specific output port for each communication channel. The device controller then obtains from the database the necessary voltages to set the mirrors in mirror array 560, and applies the required voltage to each mirror.

While input port 510 and output ports 570-1 through 570-k in FIG. 5 are shown as a linear (one dimensional) array, and the individual mirrors in micro-mirror array 560 have a single rotation axis to reflect the beam in the directions that correspond to the desired output ports, it is to be understood that the input and output ports may also be arranged in a two-dimensional array, filling the input plane more efficiently. In this case, the individual mirrors in the micro-mirror array 560 must have two orthogonal rotation axes to reflect the beam in the directions that correspond to the desired output ports.

The programmable demultiplexer depicted in FIG. 5 can be operated as a programmable multiplexer, by using ports 570-1 through 570-k as the input ports and port 510 as the output port. Each of the elements in FIG. 5 then operates in a manner that is the "reverse" of that just described. Specifically, using an input on port 570-1 as an example, the diverging beam output 538 from that port is collimated by particular aligned lens in lens array 520, and directed through lens 530 to lens 540, where the now again diverging beam is collimated and applied to grating 550. The geometry of the arrangement is such that the reflected beam from grating 550 (as well as all of the other reflected beams for the other input wavelengths and ports) are directed back through lens 540 to a specific one of the mirrors in array 560. These mirrors are arranged, in accordance with the invention, to reflect the beams back through lens 540 to the appropriate point on grating 550 such that all of the beams are reflected from the grating through lens 540 and then through lens 530, finally being all incident on the single output port 510.

The arrangement of FIG. 5 can also be easily modified to operate as a wavelength switch, as previously described for the functionality illustrated in FIG. 4. Instead of having a single input port and k output ports (in the programmable demultiplexer case), the k+1 device ports are redistributed such that there are r input ports and s output ports (where k+1=r+s). The micro-mirrors in array 560 can establish an independent connection for every input wavelength that appears on one of the r input ports to any one of the s output ports.

An alternative embodiment of the present invention is depicted in FIG. 6, again implementing a programmable demultiplexer in which one or more wavelengths contained in the input signal can be directed to each of multiple output ports. In FIG. 6, input port 610 carries the optical input signal containing multiple optical wavelengths λ-1 through λ-N of the DWDM communication system. Each of these wavelengths is to be assigned to one of the various output ports 660-1 through 660-k, as instructed by an electrical control signal 670 applied to the micro-mirror array 650. In the embodiment of FIG. 6, the input and output ports are placed at plane P6-1, which coincides with the front focal plane of the lenses in microlens array 620. The output beam 602 from the input port 610 is collimated by one lens in microlens array 620. The resultant collimated beam 605 is propagated in free space and made incident on diffraction grating 630, which angularly disperses the optical channels according to wavelength. The diffracted beam 608 of a wavelength channel λ-j (again, for convenience, only one beam for λ-j is shown) propagates to lens 640, and focuses the beam 612 at the lens's back focal plane, denoted by plane P6-2. A micro-mirror array 650 is placed at plane P6-2, with one mirror for each optical wavelength for a total of N mirrors. The mirror corresponding to the channel λ-j directs the reflected beam 615 in a desired direction, such that it will eventually couple to the correct output port. Lens 640 collimates the reflected beam 615 to beam 618, which is afterwards diffracted from diffraction grating 630. The diffracted beam 622 is propagated in free space and focused by a lens in microlens array 620 that is aligned to the desired output port. The converging beam 625 focuses at plane P6-1 where it is coupled to the desired output port (shown as port 660-$k$) in the array of output ports 660-1 through 660-$k$. Note that, as with the arrangement of FIG. 5, the device ports can be arranged in a linear array with single axis micro-mirrors, or in a two-dimensional array with two axis micro-mirrors.

The embodiment of FIG. 6 can be converted to operate as either a programmable multiplexer or a wavelength switch, as previously explained for the embodiment of FIG. 5, by "reversing" the inputs and outputs or assigning several ports to be input ports and several ports to be output ports, respectively.

An embodiment of a programmable demultiplexer arranged in accordance with the principles of the present invention, but using micro-walkoff prisms or mirrors, is depicted in FIGS. 7(*a*) and 7(*b*), in which FIG. 7(*a*) is a view of the embodiment in the y-z plane, and FIG. 7(*b*) is a view of the same embodiment, but in the x-z plane. In this embodiment, the input/output ports 710 and 770-1 through 770-$k$, respectively, are arranged in a linear array on plane P7-1. The ports are aligned along the x coordinate axis of the system. The output beam 702 of the input port 710 contains multiple optical channels at wavelengths λ-1 through λ-N. The output beam is collimated by lens 720, which is placed such that its front focal plane coincides with plane P7-1. The collimated beam 705 is incident on a reflective diffraction grating 730. The diffraction effect angularly separates the optical channels according to their optical wavelengths in the y-z plane of the coordinate system. The diffracted beam 708 represents an arbitrarily chosen optical channel at wavelength λ-j and the remaining beams of the other wavelengths are not shown, for simplicity. The beam 712 is focused by lens 720 in the back-propagation direction at plane P7-1, onto one mirror in the micro-prism array 740. The optical channels are separated in space in the y coordinate axis direction, and micro prism array 740 provides a separate prism for each wavelength. A person skilled in the art can design the optical system to provide sufficient spatial separation of the wavelength channels on the micro-prism array. In this embodiment, each micro-prism element can provide a tunable beam walkoff or shift, which is achieved by translation of a rooftop prism (two mirrors at 90 degrees). The translation direction is in the x coordinate axis. The reflected beam 715, which is spatially shifted from the incident beam 712, is collimated by lens 720. The collimated beam 718 is incident on the diffraction grating 730. The diffracted beam 722 is free space propagated to lens 720 which focuses the beam onto a desired one of the output ports 770-1 through 770-$k$. It will be further understood by a person skilled in the art that the spatial shift imposed by the micro-prism corresponding to wavelength λ-j in array 740 determines to which output port that particular wavelength channel will couple. Since each wavelength is controlled separately, it is possible to assign each wavelength independently, allowing the input optical wavelength channels to emerge on any desired output port.

The embodiment of FIG. 7 can be converted to operate as a programmable multiplexer or a wavelength switch in the same manner as previously explained in connection with the embodiment of FIG. 5.

Figure 8:
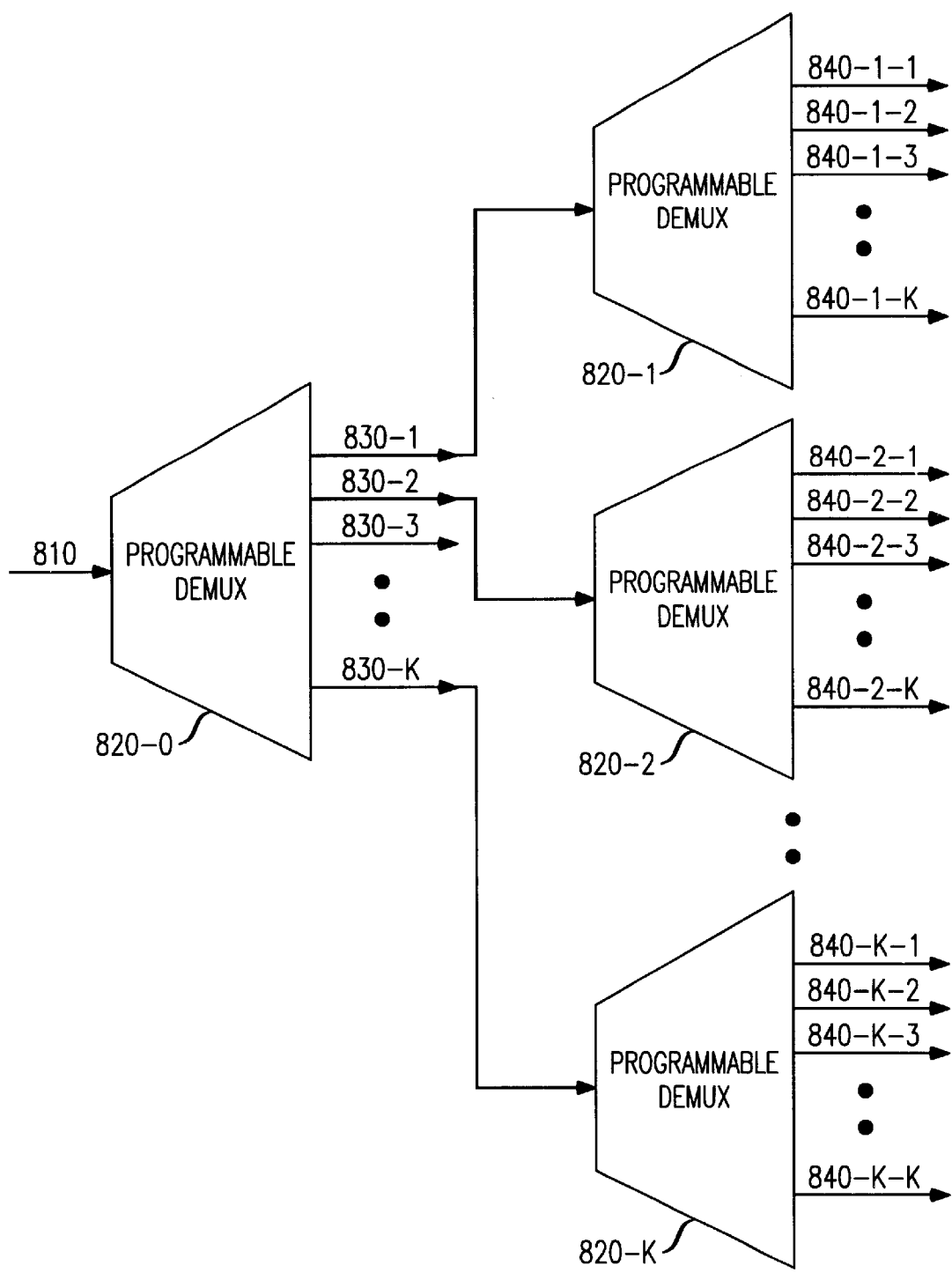
FIG. 8 is an illustration of a cascade of programmable demultiplexers for increasing the output channel count.

As the trend of increasing number of optical channels in a WDM system continues, it is likely that the number of output ports K in the programmable demultiplexer (or input ports in programmable multiplexer mode) will not continue to increase at the same rate, resulting in a desire to have an arrangement that has fewer ports relative to a larger number of channels N (i.e., K<<N). To address this situation, it is possible to use the programmable demultiplexer (or programmable multiplexer) as previously described in FIGS. 5 through 7, in a cascade arrangement or architecture. As depicted in FIG. 8, an input port 810 carries input optical channels λ-1 through λ-N to a first programmable demultiplexer 820-0. Each output port of that programmable demultiplexer is connected to a different second stage programmable demultiplexer, such that output port 830-1 is connected to programmable demultiplexer 820-1, port 830-2 to programmable demultiplexer 820-2, etc. The first programmable demultiplexer 820-0 can assign any K channels to each of its output ports. These K channels will be separated to individual output ports by the following second stage programmable demultiplexer. This architecture increases the number of available output ports from K to $K^2$. (Note that the cascaded demultiplexers are not each required to have the same number of ports, K; if one demultiplexer had K ports and another had K' ports, then the total ports for the cascade arrangement would be K·K'.) If required, the cascading approach can be continued until all channels can be assigned to separate output ports. The cascading architecture is also compatible with typical system deployments, which begin with few utilized wavelengths out of the N possible wavelengths. Initially, a few programmable demultiplexers may be deployed; as the number of operating wavelengths grows, more programmable demultiplexers can later be inserted. This solution provides a low system roll-out price with a "pay as you grow" architecture.

Based on the foregoing, it is seen that a programmable optical multiplexer/demultiplexer module, which can establish any connection between the input and output ports of the module for each wavelength independently, has been described. The programmable multiplexer/demultiplexer device has an optical arrangement for spatially dispersing the optical wavelengths, and tunable (or tilting) micro-mirrors for beam steering each channel independently. Controlling the beam reflection direction determines the connectivity between the input and output ports at the wavelength level. The functionality afforded by the present invention may become of utmost importance as optical networks with wavelength reconfiguration emerge.

Although the present invention has been described in accordance with the embodiments shown, one of ordinary skill in the art will readily recognize that there could be variations to the embodiments and those variations would be within the spirit and scope of the present invention. For example, an important concept in the present invention is the ability to modify the propagation parameters of optical beams of different wavelengths to one of many states, such that the beams can be directed to desired locations. The embodiments disclosed in the present invention described tilting mirrors and shiftable rooftop prisms as exemplary elements that can modify the propagation parameters of an incident beam. Other beam modifying elements may be substituted, such as spatial light modulators (based on liquid crystal, acousto-optic, electro-optic devices, etc.), other mirror combinations, switched volume holograms or photonic crystals, etc. As another example, while the tilting mirror arrays and micro-walkoff prism arrays were previously described as each controlling the beam propagation of a single wavelength or channel, it is to be understood that these elements can each control the beam propagation of groups of multiple channels that are contiguous in the wavelength domain. Accordingly, for example, in the programmable demultiplexer embodiment of FIG. 7, the device can process N separate wavelengths in wavelength contiguous groups, using a prism array containing less than N mirrors, to independently assign each group to any one of the K device output ports. Many other modifications may be made by one of ordinary skill in the art without departing from the spirit and scope of the appended claims.

I/We claim:

1. A programmable multiplexer in which K input signals each containing one or more different wavelengths, said K input signals cumulatively containing a total of N different wavelengths, are received from a plurality of K optical input ports and combined at a single output port, comprising
   a microlens array that contains K+1 lenses, wherein (a) one lens is aligned with the output port, while the remaining lenses are aligned each to a corresponding input port, and wherein (b) each input signal is collimated by a respective lens in said microlens array,
   a micro-mirror array containing N tilting micro-mirrors
   means for directing the resultant collimated beam originating from each input port to be incident on a diffraction grating, which diffracts the optical signal as a function of its wavelength, said diffraction grating being arranged such that each of the separate beams, which has a unique wavelength and therefore distinct propagation angle, propagates to a particular micro-mirror in said micro-mirror array, and
   means for individually controlling each mirror in the array to reflect the incident beam representing a corresponding wavelength in a desired direction, such that it will be redirected to a single location on the diffraction grating, and coupled from the diffraction grating to the output port through the particular lens in the micro-lens array that is aligned with the output port.

2. The invention defined in claim 1 wherein the number of input posts K and optical wavelength components N are independent.

3. The invention defined in claim 1 wherein K=N, so that each wavelength component can originate at any input port.

4. The invention defined in claim 1 wherein K<N, and more than one wavelength is applied to an input port.

5. The invention defined in claim 1 wherein K>N, and one or more input ports are not used.

6. An optical demultiplexer arranged to receive a composite optical signal containing multiple wavelengths, and direct each of said wavelengths to a desired one of a plurality of separate output ports, comprising a diffraction grating,
   first means for directing said composite signal to said diffraction grating, whereby said multiple wavelengths are angularly dispersed at distinct propagation angles according to wavelength, thereby forming N separate beams having different wavelengths,
   a beam modifying array having a plurality of elements,
   second means for directing said N separate beams to individual ones of said elements in said beam modifying array, and
   means for controlling the elements in said beam modifying array such that each of said N separate beams after modification from said beam modifying elements are directed to a desired one of said plurality of separate output ports.

7. The invention defined in claim 6 wherein said elements in said beam modifying array are tilting mirrors.

8. The invention defined in claim 6 wherein said elements in said beam modifying array are translating rooftop prisms.

9. The invention defined in claim 6 wherein said optical demultiplexer further includes means for combining two or more of said reflected beams for application to a particular one of said plurality of separate output ports.

10. The invention defined in claim 9 wherein said means for combining includes an optical beam diffracting means.

11. The invention defined in claim 6 wherein said first directing means includes a lens in a micro-lens array.

12. The invention defined in claim 11 wherein each of said N separate beams are directed to a desired one of said plurality of separate output ports via other lenses in said micro-lens array.

13. The invention defined in claim 6 wherein said second directing means includes a lens.

14. The invention defined in claim 13 wherein each of said separate beams is directed by said lens to be incident on said diffraction grating.

15. A programmable optical switch in which r input signals each containing one or more different wavelengths, said r input signals cumulatively containing a plurality of different wavelengths, are received from a plurality of r optical input ports and one or more of said wavelengths are made available at each of s different output ports, comprising
   a microlens array that contains r+s lenses, wherein (a) one lens is aligned with each of a corresponding one of said s output ports, while the remaining lenses are aligned each to a corresponding one of said r input ports, and wherein (b) each input signal is collimated by a respective lens in said microlens array,
   a micro-mirror array containing a plurality of tilting micro-mirrors,
   means for directing the resultant r collimated beams originating from each of said r input ports to be incident on a diffraction grating, which diffracts the r optical signals as a function of their respective wavelengths, said diffraction grating being arranged such that each of the separate beams, which have different wavelengths and therefore distinct propagation angles, propagate to a particular micro-mirror in said micro-mirror array, and
   means for individually controlling each mirror in the array to reflect the incident beam representing a corresponding wavelength in a desired direction, such that it will be redirected to a location on the diffraction grating, and coupled from the diffraction grating to one of said s output ports through the particular lens in the micro-lens array that is aligned with said one output port.

16. The invention defined in claim 15 wherein said r input signals contain N separate wavelengths, and wherein said micro-mirror array contains at least N mirrors.

17. The invention defined in claim 15 wherein said directing means includes a lens.

18. The invention defined in claim 17 wherein said N separate beams are focused by said lens.

19. The invention defined by claim 15 wherein said micro-lens array is a linear array.

20. The invention defined by claim 15 wherein said micro-lens array is a two-dimensional array.

21. The invention defined in claim 15 wherein said r input signals contain N separate wavelengths, and wherein said micro-mirror array contain less than N mirrors.

22. A programmable optical demultiplexer arranged to receive a composite input signal containing components at N different wavelengths from an optical input port, and independently distribute the input signal components among K output ports, comprising
   a first optical beam diffracting means,
   a micro-lens array containing K+1 lenses, each of the K lenses aligned to a respective one of said K output ports and another lens aligned to said optical input port and arranged to collimate the input signal, optical means for directing the collimated input signal to be incident on a second optical beam diffracting means, thereby forming N separate beams having different wavelengths, and to collect each of said N separate beams and generate, for each said beam, a converging beam focused onto a micro-mirror in a micro-mirror array, and means for individually controlling each mirror in said micro-mirror array to reflect incident beams in desired directions, such that said beams are coupled through said micro-lens array to desired ones of said output ports.

23. The invention defined in claim 22, wherein said optical means for directing the collimated input signal comprises one or more lenses.

24. The invention defined in claim 22, wherein said second optical beam diffracting means is a diffraction grating.

25. The invention defined in claim 22 wherein said optical means for directing the collimated input signal is free space propagation of the collimated beams directly onto said second optical beam diffracting means.

26. The invention defined in claim 22 wherein said micro-lens array is a linear array.

27. The invention defined in claim 22 wherein said micro-lens array is a two-dimensional array.

28. The invention defined in claim 22 wherein the number of output ports K optical wavelength components N are independent.

29. The invention defined in claim 28 wherein K=N and each wavelength component can be assigned to any output port.

30. The invention defined in claim 28 wherein K<N and more than one wavelength is applied to an output port.

31. The invention defined in claim 28 wherein K>N and one or more output ports are not used.

32. A programmable demultiplexer in which K output signals each containing one or more different wavelengths, said K output signals cumulatively containing a total of N different wavelengths, are received by a plurality of K optical output ports from a single input port, comprising a microlens array that contains K+1 lenses, wherein (a) one lens is aligned with the input port, while the remaining lenses are aligned each to a corresponding output port, and wherein (b) an input signal is collimated by the respective lens in said microlens array, a micro-mirror array containing N tilting micro-mirrors means for directing the resultant collimated beam originating from the input port to be incident on a diffraction grating, which diffracts the optical signal as a function of its wavelength, said diffraction grating being arranged such that each of the separate beams, which has a unique wavelength and therefore distinct propagation angle, propagates to a particular micro-mirror in said micro-mirror array, and means for individually controlling each mirror in the array to reflect the incident beam representing a corresponding wavelength in a desired direction, such that it will be redirected to a single location on the diffraction grating, and coupled from the diffraction grating through said micro-lens array to desired ones of said output ports.

* * * * *